United States Patent [19]

Bisel et al.

[11] Patent Number: 5,230,313

[45] Date of Patent: Jul. 27, 1993

[54] GAS ENGINE CYLINDER HEAD, AND A METHOD OF RETROFITTING THE HEAD WITH A PRECOMBUSTION CHAMBER UNIT

[75] Inventors: Gary Bisel, Westfield, Pa.; Charles F. Wilke, Big Flats, N.Y.

[73] Assignee: Dresser-Rand Company, Corning, N.Y.

[21] Appl. No.: 980,050

[22] Filed: Nov. 23, 1992

[51] Int. Cl.$^5$ .............................................. F02B 19/00
[52] U.S. Cl. .................................................... 123/266
[58] Field of Search ................... 123/266, 260, 267; 313/143

[56] References Cited

U.S. PATENT DOCUMENTS

| | | | |
|---|---|---|---|
| 2,100,320 | 11/1937 | Browning | 123/266 |
| 2,456,080 | 12/1948 | Wu Pe | 123/266 |
| 3,710,764 | 1/1973 | Jozlin | 123/266 |
| 4,465,031 | 8/1984 | Bamer et al. | 123/260 |
| 4,499,399 | 2/1985 | Flores | 313/143 |
| 4,509,476 | 4/1985 | Breuser et al. | 123/266 |
| 4,516,548 | 5/1985 | May | 123/260 |
| 4,542,724 | 9/1985 | Blais | 123/266 |
| 4,646,695 | 3/1987 | Blackburn | 123/266 |
| 4,930,473 | 6/1990 | Dietrich | 123/266 |
| 4,977,873 | 12/1990 | Cherry et al. | 123/267 |

*Primary Examiner*—Raymond A. Nelli
*Attorney, Agent, or Firm*—Bernard J. Murphy

[57] ABSTRACT

The cylinder head has a conventional spark plug, therein, for engine start-up, and has a precombustion chamber unit mounted therein as well, for cleaner, more stable normal running of the engine. The method defines the reaming out of spark plug apertures in the head to accommodate the installation of the precombustion chamber unit.

2 Claims, 1 Drawing Sheet

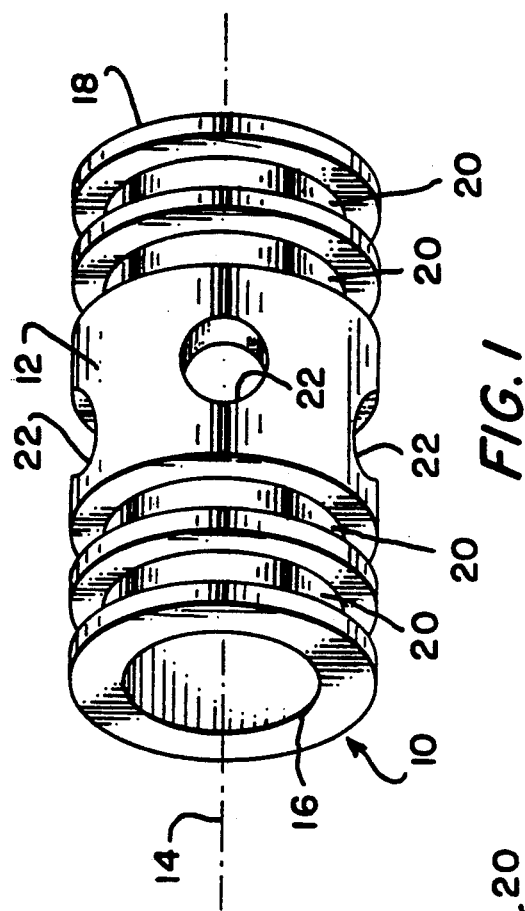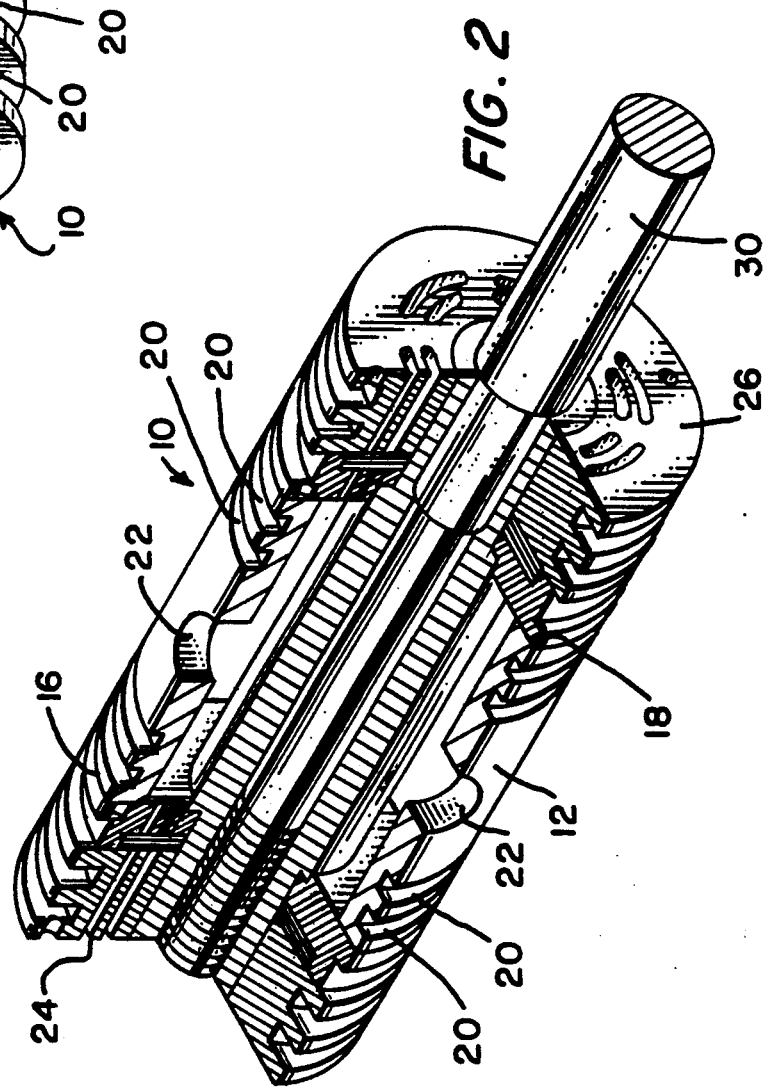

GAS ENGINE CYLINDER HEAD, AND A METHOD OF RETROFITTING THE HEAD WITH A PRECOMBUSTION CHAMBER UNIT

This invention pertains to cylinder heads for reciprocating-type, gas engines, and to methods of retrofitting such cylinder heads toward improving performance of the gas engines.

In the prior art there are gas engines which have cylinder heads which mount a pair of spark plugs and, accordingly, operate with a relatively rich air-fuel mixture. Typical thereof are gas engines manufactured by Worthington Compressor Company and having model numbers SUTC, MLI and MLV. Such engines are of excellent construction and offer durable performance. However, in that they function with spark plugs and less than a lean air-fuel mixture, they are susceptible to emitting exhaust with an excess of oxides of nitrogen, and exhibit a somewhat unstable operation.

It is an object of this invention to set forth a gas engine cylinder head which accommodates a spark plug, for initiating engine operation, and also accommodates a precombustion chamber unit, for enabling engine operation with a lean air-fuel mixture following start-up of the engine.

It is also an object of this invention to set forth a method of retrofitting a gas engine cylinder head, which mounts therein a pair of spark plugs, for reception of a precombustion chamber unit, in order that the engine can operate with such a lean air-fuel mixture to minimize the noxious emissions thereof and to improve the operating stability thereof.

Particularly, it is an object of this invention to set forth a gas engine cylinder head comprising a cylinder head body; wherein said head has first, aligned, spark plug-receiving apertures therein; said head also has second, aligned, precombustion chamber unit-receiving apertures formed therein; a spark plug set in said first apertures; and a precombustion chamber unit set in said second apertures.

Too, it is an object of this invention to disclose, for a gas engine cylinder head which has first, aligned, spark-plug receiving apertures, for a first spark plug, and second, aligned spark plug-receiving apertures, for a second spark plug, formed therein, a method of retrofitting the head with a precombustion chamber unit, comprising the steps of reamingly enlarging the spark plug-receiving apertures for one of the spark plugs; and installing into such reamingly enlarged apertures, a precombustion chamber unit.

Further objects of this invention, as well as the novel features and steps thereof will become apparent by reference to the following description, taken in conjunction with the accompanying figures, in which:

BRIEF DESCRIPTION OF FIGURES

As shown in FIG. 1, a power piston 10 is reciprocable in a cylinder 12, and the latter mounts a cylinder head 14 thereupon. The cylinder head 14 has been retrofitted according to the novel method as set out herein. The head 14 has first, aligned, spark plug-receiving apertures 16 and 18 in which to receive a first spark plug 20. It had second, aligned, spark-plug-receiving apertures in which to receive a second spark plug, however, the lateral halves been altered to receive a precombustion chamber unit 22. The body 24 of the head 14 has aligned, unit-receiving apertures 26 and 28 formed therein.

FIG. 2 illustrates, in greater detail the emplacement of the unit 22. The unit 22 has a flame nozzle 30 which seats in aperture 28 with a portion of the nozzle 30 protruding through the body 24 of the head 14. The unit 22 has a portion 32 thereof with a given diameter which is smaller than the diameter of the uppermost portion of aperture 28. Portion 32 sets upon a and 33 formed in an intermediate location in apertures 18. Due to the aforesaid different diameters, there obtains an annular void 34 between portion 32 of the unit 22 and the greater-diameter portion 35 of aperture 28. The body 24, according to well known practices, has a water jacket formed therein which confines cooling water. The water is free to flow into the void 34 to assist in cooling the unit 22. In addition, a sleeve 36, which has a pair of ports 38 and 40 formed therein, is set into the aperture 26 and against the portion 32 to hold the unit 22 in place against the land 33. Here too, the port 38 and 40 allow the cooling water to flow about the unit 22 to carry off excess heat. To insure that water will not enter the cylinder 12, a fluid seal 42 is set under the portion 32 of the unit 22, and another fluid seal 44 is interposed between the sleeve 36 and unit 22. The sleeve is made fast against the portion 32 by a clamping plate 46. The latter is fastened to the body 24 by means of machine screws 48 and 50. A tapped hole 52 is formed in the body 24 to receive screw 48, and an internally and externally tapped plug 54 is set in a pre-existing hole 56 to receive screw 50. The unit 22 has a precombustion chamber 58 formed therein, a spark plug 60, a fuel gas conduit 62, and a check valve 64, consequently the unit 22 is of generally known components and function in the well known way. Ports 38 and 40 are parallel, and radially aligned, with chamber 58. Sleeve 36 opens externally of the body 24 to permit ambient atmosphere to enter and flow about the spark plug 60 and fuel conduit 62; the spark plug 60 and fuel conduit 62 are confined in, both are spaced apart from, the sleeve 36.

Figure 1:
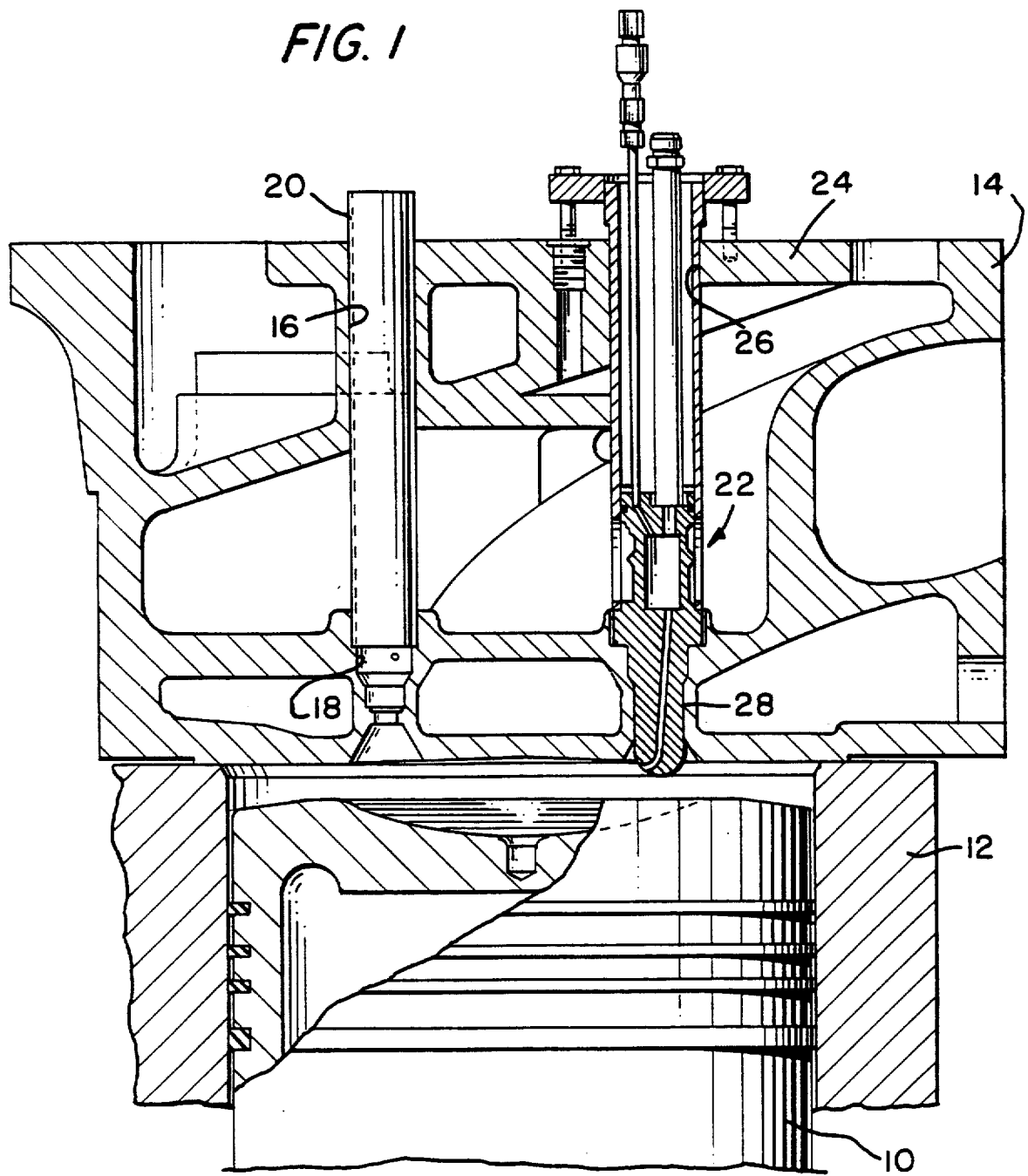
FIG. 1 is a side elevational view, partly cross-sectioned, of a power piston, a cylinder, and a cylinder head therefor according to the invention, the latter having been retrofitted pursuant to the novel method.

Retrofitting of the cylinder head 14, to accommodate the unit 22, comprises reamingly enlarging apertures which had been provisional for a second spark plug, i.e., apertures corresponding to apertures 16 and 18, into larger diameter apertures 26 and 28 in order to accommodate the unit 22, and the sleeve 36. The seal 42 is set under the portion 32 of the unit 22, and the seal 44 is interposed between the sleeve 36 and the unit 22. The clamping plate 46 is set atop the outer end of the sleeve 36 and fastened to the body 24.

As is conventional, the unit ignites a leaner mixture which is cooler, and offers a higher ignition energy source to insure that the mixture will burn faster. The reduction in combustion time and temperature greatly reduces the aforesaid noxious emissions. Spark plug 20 is retained in place to facilitate a start-up of the gas engine. However, after start-up, only the unit 22 is operative.

While we have described our invention in connection with a specific embodiment of the novel cylinder head, and a specified method of retrofitting a cylinder head to accommodate a precombustion chamber unit, it is to be understood that there are done only by way of example. The retrofit is especially adaptable to the aforementioned Worthington Company gas engine, however it is believed that our teaching will enable such retrofitting of other, similar engines. Accordingly, the invention is not be be deemed limited by the embodiments and method steps specified, both only by the scope of the appending claims.

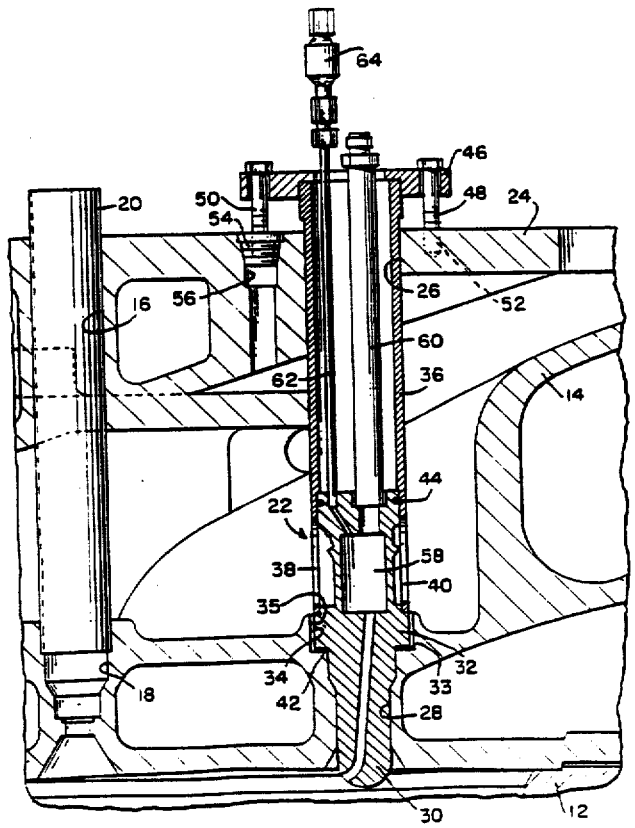

We claim:

1. A gas engine cylinder head, comprising:
a cylinder head body; wherein
said body has first, aligned, spark plug-receiving apertures formed therein;
said body also has second, aligned, precombustion chamber unit-receiving apertures formed therein;
a spark plug set in said first apertures; and
a precombustion chamber unit set in said second apertures; wherein
one of said second apertures is formed in an outermost portion of said body and another of said second apertures is formed in an inner portion of said body;
said another aperture has a first diameter portion and a second diameter portion, and an annular land obtains between said first and second diameter portions;
said unit has an intermediate portion which is set upon said land, and cooperates with said first diameter portion of said another aperture to form an annular void therebetween in which to accommodate fluid flow; and further including
a fluid seal interposed between said intermediate portion of said unit and said land;
a sleeve in penetration of said one aperture and enclosing said unit therewithin; wherein
said unit has a precombustion chamber formed therewithin;
said sleeve has a plurality of fluid-accommodating ports formed therein;
said ports are parallel, and radially aligned, with said chamber;
an end of said sleeve is engaged with said intermediate portion of said unit for holding said intermediate portion upon said land;
an opposite end of said sleeve opens externally of said body accommodating admittance of ambient atmosphere thereinto;
said unit comprises (a) a spark plug, and (b) a fuel conduit; and
said spark plug and said conduit are confined within, and spaced apart from, said sleeve to permit ambient atmosphere entering said sleeve to flow about said spark plug and said conduit.

2. A gas engine cylinder head, according to claim 1, further including:
means coupled to said body for clamping said sleeve in said second apertures.

* * * * *

UNITED STATES PATENT AND TRADEMARK OFFICE
CERTIFICATE OF CORRECTION

PATENT NO. : 5,230,313
DATED : July 27, 1993
INVENTOR(S) : Gary Bisel et al

It is certified that error appears in the above-indentified patent and that said Letters Patent is hereby corrected as shown below:

The title page should be deleted to appear as per attached title page.

Figure 2:
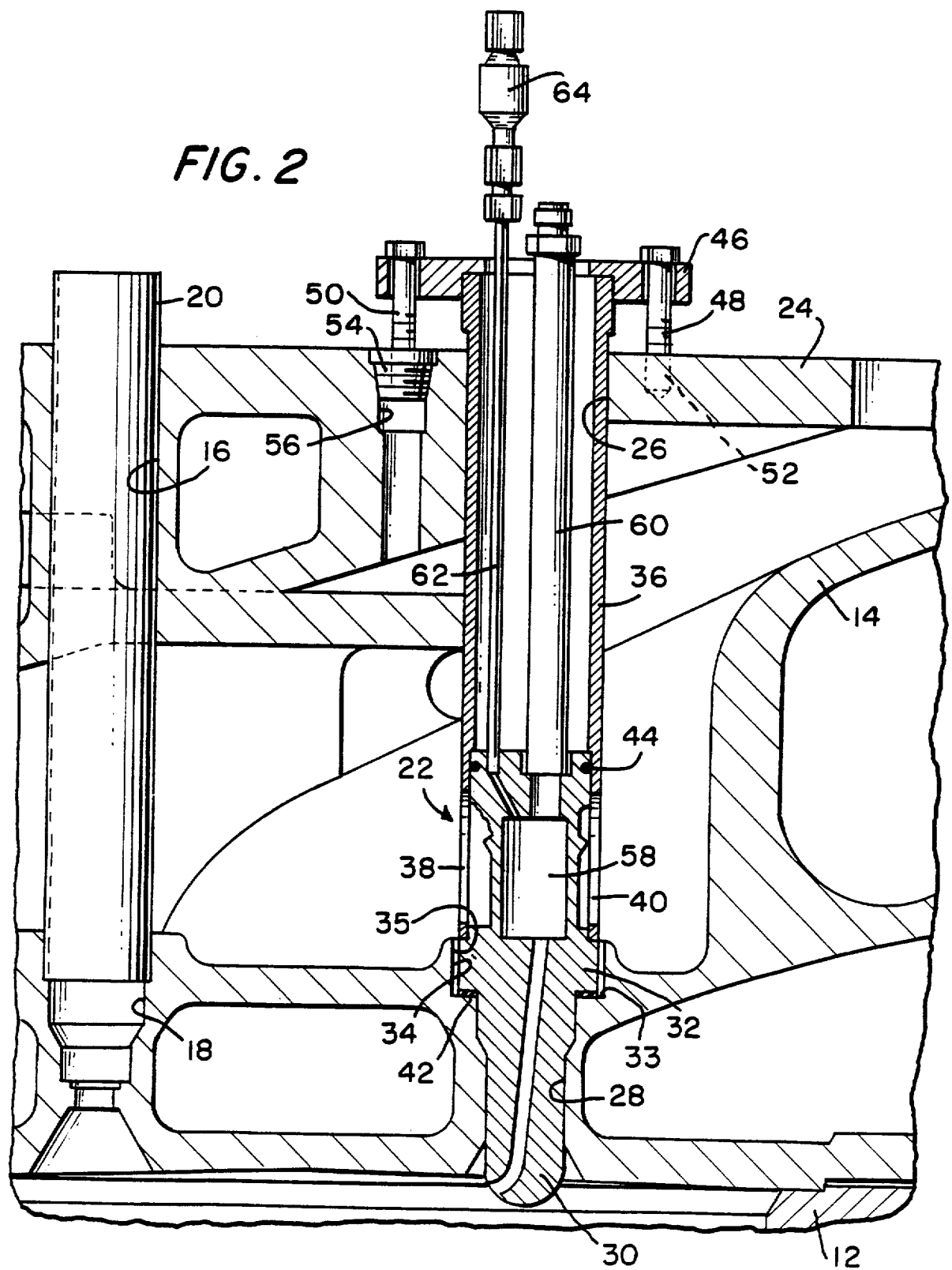
FIG. 2 is a view like that of FIG. 1, albeit greatly enlarged thereover, showing in greater detail the more relevant portion of the subject cylinder head.

Figures 1 and 2 should be deleted to be replaced with figures 1 and 2 as shown on the attached sheets.

Signed and Sealed this

Third Day of January, 1995

Attest:

BRUCE LEHMAN

Attesting Officer

Commissioner of Patents and Trademarks

United States Patent [19]

Bisel et al.

[11] Patent Number: 5,230,313
[45] Date of Patent: Jul. 27, 1993

[54] GAS ENGINE CYLINDER HEAD, AND A METHOD OF RETROFITTING THE HEAD WITH A PRECOMBUSTION CHAMBER UNIT

[75] Inventors: Gary Bisel, Westfield, Pa.; Charles F. Wilke, Big Flats, N.Y.

[73] Assignee: Dresser-Rand Company, Corning, N.Y.

[21] Appl. No.: 980,050

[22] Filed: Nov. 23, 1992

[51] Int. Cl.⁵ .............................. F02B 19/00
[52] U.S. Cl. .............................. 123/266
[58] Field of Search .......... 123/266, 260, 267; 313/143

[56] References Cited

U.S. PATENT DOCUMENTS

| 2,100,320 | 11/1937 | Browning | 123/266 |
| 2,456,080 | 12/1948 | Wu Pe | 123/266 |
| 3,710,764 | 1/1973 | Jozlin | 123/266 |
| 4,465,031 | 8/1984 | Bamer et al. | 123/260 |
| 4,499,399 | 2/1985 | Flores | 313/143 |
| 4,509,476 | 4/1985 | Breuser et al. | 123/266 |
| 4,516,548 | 5/1985 | May | 123/260 |
| 4,542,724 | 9/1985 | Blais | 123/266 |
| 4,646,695 | 3/1987 | Blackburn | 123/266 |
| 4,930,473 | 6/1990 | Dietrich | 123/266 |
| 4,977,873 | 12/1990 | Cherry et al. | 123/267 |

Primary Examiner—Raymond A. Nelli
Attorney, Agent, or Firm—Bernard J. Murphy

[57] ABSTRACT

The cylinder head has a conventional spark plug, therein, for engine start-up, and has a precombustion chamber unit mounted therein as well, for cleaner, more stable normal running of the engine. The method defines the reaming out of spark plug apertures in the head to accommodate the installation of the precombustion chamber unit.

2 Claims, 1 Drawing Sheet